(12) United States Patent
Martin

(10) Patent No.: US 10,124,654 B2
(45) Date of Patent: Nov. 13, 2018

(54) WINDSHIELD ASSEMBLY AND METHOD OF USING SAME

(71) Applicant: Custom Golf Car Supply, Inc., Salisbury, NC (US)

(72) Inventor: Jeffrey Steven Martin, Troutman, NC (US)

(73) Assignee: Custom Golf Car Supply, Inc., Salisbury, NC (US)

(*) Notice: Subject to any disclaimer, the term of this patent is extended or adjusted under 35 U.S.C. 154(b) by 310 days.

(21) Appl. No.: 15/143,794

(22) Filed: May 2, 2016

(65) Prior Publication Data

US 2016/0318376 A1 Nov. 3, 2016

Related U.S. Application Data

(60) Provisional application No. 62/155,513, filed on May 1, 2015.

(51) Int. Cl.
*B60J 1/06* (2006.01)
*B60J 1/00* (2006.01)

(52) U.S. Cl.
CPC .............................. *B60J 1/06* (2013.01); *B60J 1/006* (2013.01)

(58) Field of Classification Search
CPC ... B60J 1/006; B60J 1/06; B60J 1/1876; B60J 1/1884
USPC ..................................................... 296/86, 87
See application file for complete search history.

(56) References Cited

U.S. PATENT DOCUMENTS

| | | | | |
|---|---|---|---|---|
| 849,733 | A * | 4/1907 | Graff | B60J 1/06 296/87 |
| 879,195 | A * | 2/1908 | Samuel | B60J 1/06 296/87 |
| 942,225 | A * | 12/1909 | Towle | B60J 1/06 296/88 |
| 1,023,901 | A * | 4/1912 | Webster | B60J 1/06 296/88 |
| 1,085,113 | A * | 1/1914 | De Anguera, Jr. | B60J 1/06 296/87 |
| 4,773,695 | A * | 9/1988 | Jones | B60J 1/06 280/DIG. 5 |

(Continued)

FOREIGN PATENT DOCUMENTS

JP 2009214558 A * 9/2009 ................ B60J 1/06

*Primary Examiner* — Lori L Lyjak
(74) *Attorney, Agent, or Firm* — Ashley Law Firm P.C.; Stephen S. Ashley, Jr.

(57) ABSTRACT

A windshield assembly includes a lower panel section pivotally connected to an upper panel section. The assembly is movable between an extended position, in which both sections are fully extended and substantially co-planar, and a pivoted position, in which the upper section is pivoted down to rest on top of the lower section. A pair of magnets are positioned on the upper section proximate the top edge of the upper section, and a second pair of complementary magnets or members made of a material that is magnetically attracted to the first pair of magnets are positioned on the lower section proximate the bottom edge of the lower section. When in the pivoted position, the magnets on the upper section engage the lower section magnets, thereby keeping the upper section secured on the lower section and preventing unwanted movement of the upper section as the golf car travels.

17 Claims, 9 Drawing Sheets

(56) References Cited

U.S. PATENT DOCUMENTS

| | | | |
|---|---|---|---|
| 5,192,109 A * | 3/1993 | Roberts | B60J 1/06 280/DIG. 5 |
| 5,195,797 A | 3/1993 | Hobbs | |
| 5,275,460 A * | 1/1994 | Kraus | B60J 11/06 150/166 |
| 5,295,527 A * | 3/1994 | West | E05F 15/605 160/199 |
| 5,307,725 A * | 5/1994 | Desmond | F41H 5/263 296/152 |
| 5,385,380 A * | 1/1995 | Heavner | B60J 1/04 280/DIG. 5 |
| 5,472,255 A * | 12/1995 | Moore | B60J 3/0208 296/97.6 |
| 5,954,385 A | 9/1999 | Moore et al. | |
| 6,902,220 B2 | 6/2005 | Moskos et al. | |
| 7,165,802 B1 * | 1/2007 | Flynn | B60J 1/06 296/84.1 |
| 7,311,347 B1 * | 12/2007 | Aller | A63B 55/61 296/77.1 |
| 7,354,092 B2 | 4/2008 | Showalter et al. | |
| 7,380,860 B2 | 6/2008 | Dolan | |
| 7,390,051 B2 * | 6/2008 | Bruntz | B60J 1/06 296/146.16 |
| 8,668,242 B2 | 3/2014 | Sobik | |
| 9,039,064 B1 | 5/2015 | Baude | |
| 2006/0249976 A1 * | 11/2006 | Hanson | B60J 1/06 296/77.1 |
| 2009/0179446 A1 * | 7/2009 | Ahlers | A45C 9/00 294/137 |
| 2009/0229094 A1 * | 9/2009 | Reese | B60J 1/006 24/530 |
| 2009/0230714 A1 * | 9/2009 | Reese | B60J 1/06 296/92 |
| 2009/0230715 A1 | 9/2009 | Brinkhorst | |
| 2009/0278373 A1 * | 11/2009 | Rouzer | B60J 1/06 296/92 |
| 2011/0001331 A1 * | 1/2011 | Hirneise | B60J 1/06 296/87 |
| 2013/0062905 A1 * | 3/2013 | Held | B60R 5/047 296/141 |
| 2013/0075046 A1 * | 3/2013 | Trousdale | E06B 9/0638 160/84.08 |
| 2014/0203588 A1 * | 7/2014 | Tyrer | B60J 1/006 296/79 |
| 2015/0043051 A1 * | 2/2015 | Woodrow | B60J 3/04 359/241 |
| 2015/0076854 A1 | 3/2015 | Salamon | |
| 2017/0202727 A1 * | 7/2017 | Wegener | A61H 3/04 |
| 2018/0043755 A1 * | 2/2018 | Ye | B60J 1/06 |

\* cited by examiner

WINDSHIELD ASSEMBLY AND METHOD OF USING SAME

CROSS REFERENCE TO RELATED APPLICATIONS

This application claims priority to U.S. Provisional Patent Application No. 62/155,513, filed May 1, 2015 and incorporated herein by reference.

TECHNICAL FIELD OF INVENTION

The present invention relates to windshields. An embodiment of the invention comprises a windshield assembly for use on a recreational vehicle, such as a golf car.

BACKGROUND OF INVENTION

It is common today for recreational vehicles, and in particular golf cars, to have windshield assemblies in which at least a part of the windshield can be selectively moved between a closed position and an open position. As such, occupants can choose to have the windshield assembly completely closed, such as when it is needed to protect against adverse weather, wind and sun or move the windshield assembly to the open position whenever desirable, such as when the occupants want to feel the wind breeze freely through the golf car as the golf car moves.

The present invention provides a new windshield assembly that can be used on recreational vehicles such as golf cars having advantages and benefits over the prior art.

SUMMARY OF INVENTION

Accordingly, an object of the present invention is to provide a windshield assembly for use on recreational vehicles, such as golf cars. Another object of the present invention is to provide a windshield assembly that can be moved between a closed position, in which the windshield assembly provides a barrier between the vehicle occupants and the outdoor elements and an open position in which a part of the assembly is moved such that the assembly does not separate the occupants from the outdoor elements. These and other objectives of the invention can be achieved in various embodiments of the invention described below.

One embodiment of the invention comprises a windshield assembly for positioning on a vehicle comprising a first panel section pivotally connected to a second panel section. The windshield assembly is movable between an extended position in which the first panel section and the second panel section are substantially co-planar, and a pivoted position in which the first panel section and the second panel section are substantially co-facing each other. A first attachment member comprising at least one magnet positioned on the first panel section, and a second attachment member positioned at a complementary position whereby the first attachment member contacts the second attachment member when the windshield assembly is in the pivoted position, the second attachment member comprising a material that is magnetically attracted to the first attachment member magnet, whereby the first attachment member and the second attachment member are magnetically engaged when the windshield assembly is in the pivoted position.

According to another embodiment of the invention, the windshield assembly is adapted for positioning on support posts of a golf car.

According to another embodiment of the invention, the second attachment member is positioned on the second panel section.

According to another embodiment of the invention, the second attachment member is positioned on at least one support post of a golf car.

According to another embodiment of the invention, the first panel section and the second panel section are pivotally connected by a hinge.

According to another embodiment of the invention, the first panel section and the second panel section are comprised of a single panel having an integrally formed hinge crease defining the first panel section and the second panel section.

According to another embodiment of the invention, the windshield assembly includes a plurality of rubber coated magnets.

According to another embodiment of the invention, the second attachment member is comprised of a nickel plated steel disk or a metal screw assembly.

Another embodiment of the invention comprises a windshield assembly for a golf car comprising an upper panel section pivotally connected to a lower panel section. The upper panel and lower panel sections are adapted for positioning on support posts of a golf car. Each of the upper and lower panel sections have an interior surface facing the interior of the golf car and an exterior surface facing the exterior of the golf car, and the windshield assembly is movable between an extended position in which the upper panel section and the lower panel section are substantially co-planar, and a pivoted position in which the upper panel section and the lower panel section are substantially co-facing each other. At least one upper magnetic member is positioned on the exterior surface of the upper panel section, and at least one lower magnetic member is positioned at a complementary position on the exterior surface of the lower panel section such that the upper magnetic member contacts the lower magnetic member when the windshield assembly is in the pivoted position. The upper magnetic member is magnetically attracted to the lower magnetic member, so that the upper magnetic member and the lower magnetic member are magnetically engaged when the windshield assembly is in the pivoted position.

According to another embodiment of the invention, the upper panel section and the lower panel section are substantially rectangular and/or substantially trapezoidal.

According to another embodiment of the invention, the upper and lower panel sections comprise two separate panels that are pivotally connected to each other by a hinge member that is attached to both panels.

According to another embodiment of the invention, the upper and lower panel sections can be sections of one windshield panel having a hinge crease integrally formed in the windshield panel along a line that defines the upper and lower panel sections.

According to another embodiment of the invention, first and second mounting brackets can be positioned on opposing sides of the lower panel section for attaching the lower panel section to support posts of the golf car.

According to another embodiment of the invention, a pair of recessed sections are formed in opposed side edges of the lower panel section proximate lower corners of the lower panel section. Each recessed section defines an edge for resting on a support member attached to the support posts of the golf car.

According to another embodiment of the invention, the at least one upper magnetic member comprises a first pair of magnets attached to the exterior surface of the upper panel section proximate upper corners of the upper panel section.

According to another embodiment of the invention, the at least one lower magnetic member comprises a pair of ferromagnetic members, such as nickel plated steel disks, attached to the lower panel section proximate lower corners of the lower panel section.

According to another embodiment of the invention, a second pair of magnets are attached to the interior surface of the upper panel section proximate the upper corners of the upper panel section, and a pair of complementary magnetic members are attached to the golf car support posts for magnetically engaging the second pair of magnets when the windshield assembly is in the extended position.

Another embodiment of the invention comprises a windshield assembly for a golf car comprising an upper panel section pivotally connected to a lower panel section. The upper panel and lower panel sections are adapted for positioning on support posts of a golf car. Each panel section has an interior surface facing the interior of the golf car and an exterior surface facing the exterior of the golf car. The windshield assembly is movable between an extended position in which the upper panel section and the lower panel section are substantially co-planar, and a pivoted position in which the upper panel section and the lower panel section are substantially co-facing each other. A pair of upper magnetic members are positioned on the outer surface of the upper panel section, and a pair of lower magnetic members are positioned at complementary positions on the golf car support posts such that the upper magnetic members contact the lower magnetic members when the windshield assembly is in the pivoted position. The upper magnetic members are magnetically attracted to the lower magnetic members such that the upper magnetic members and the lower magnetic members are magnetically engaged when the windshield assembly is in the pivoted position.

According to another embodiment of the invention, the upper panel section and lower panel section are substantially rectangular and/or substantially trapezoidal.

According to another embodiment of the invention, the lower section includes a pair of recessed sections formed proximate lower corners of the lower panel section, in which the recessed sections allow for the lower magnetic members to extend through the lower panel section and contact the upper magnetic members when the windshield assembly is in the pivoted position.

According to another embodiment of the invention, the upper magnetic members can be a pair of magnets attached to the exterior surface of the upper panel section proximate upper corners of the upper panel section.

According to another embodiment of the invention, the lower magnetic members can be a pair of ferromagnetic members, such as metal screw assemblies.

BRIEF DESCRIPTION OF THE DRAWINGS

FIG. 1A is an enlarged view of a portion of FIG. 1;
FIG. 1B is another enlarged view of a portion of FIG. 1;
FIG. 3A is an enlarged view of a portion of FIG. 3.

FIG. 4A is an enlarged view of a portion of FIG. 4;
FIG. 5A is an enlarged view an enlarged view of a portion of FIG. 5;
FIG. 5B is another enlarged view of a portion of FIG. 5;
FIG. 7A is an enlarged view of a portion of FIG. 7;
FIG. 8A is an enlarged view of a portion of FIG. 8.

DETAILED DESCRIPTION OF PREFERRED EMBODIMENTS OF THE INVENTION

Figure 1:
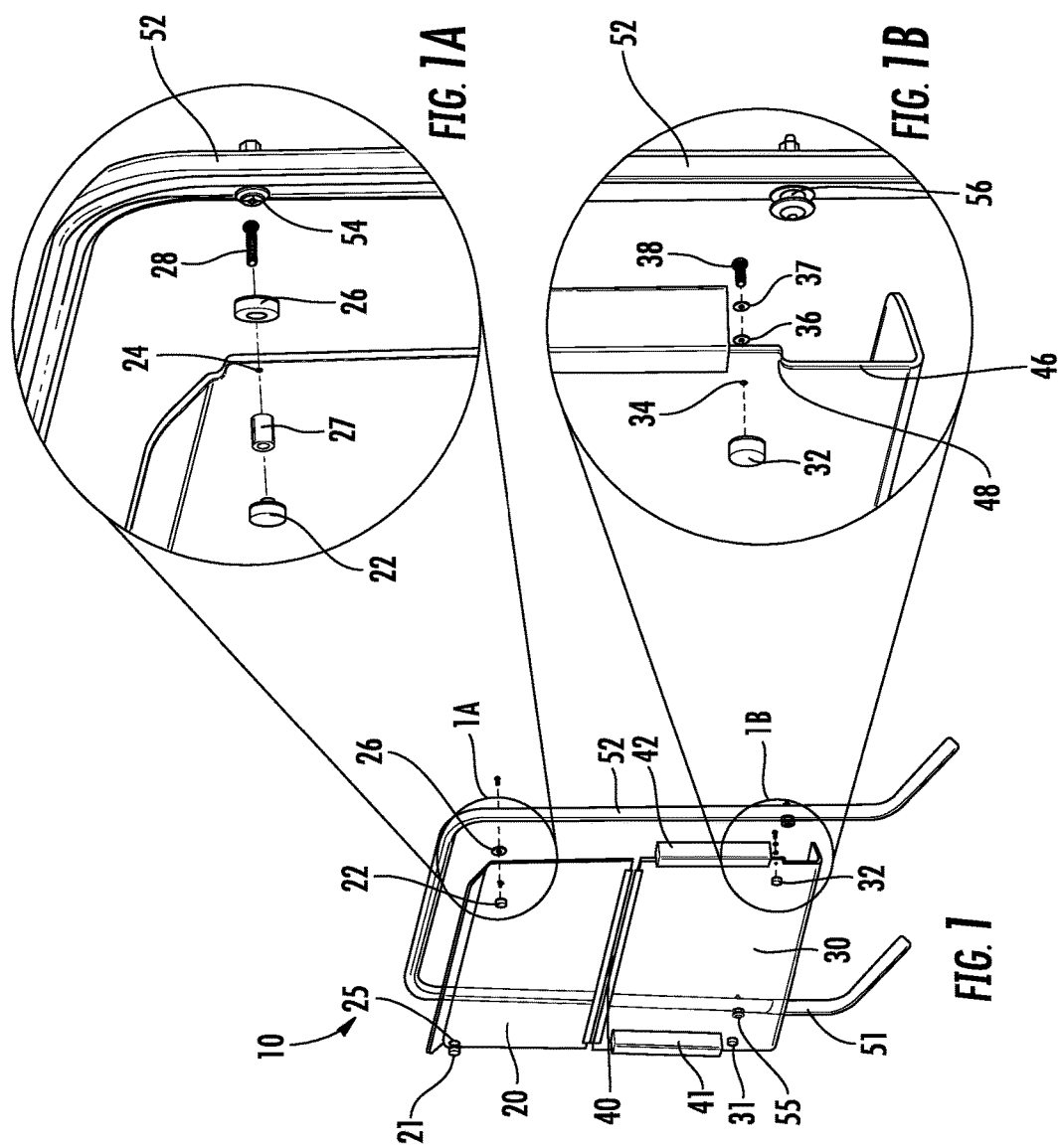
FIG. 1 is a perspective view of a windshield assembly according to a preferred embodiment of the invention.
Figure 2:
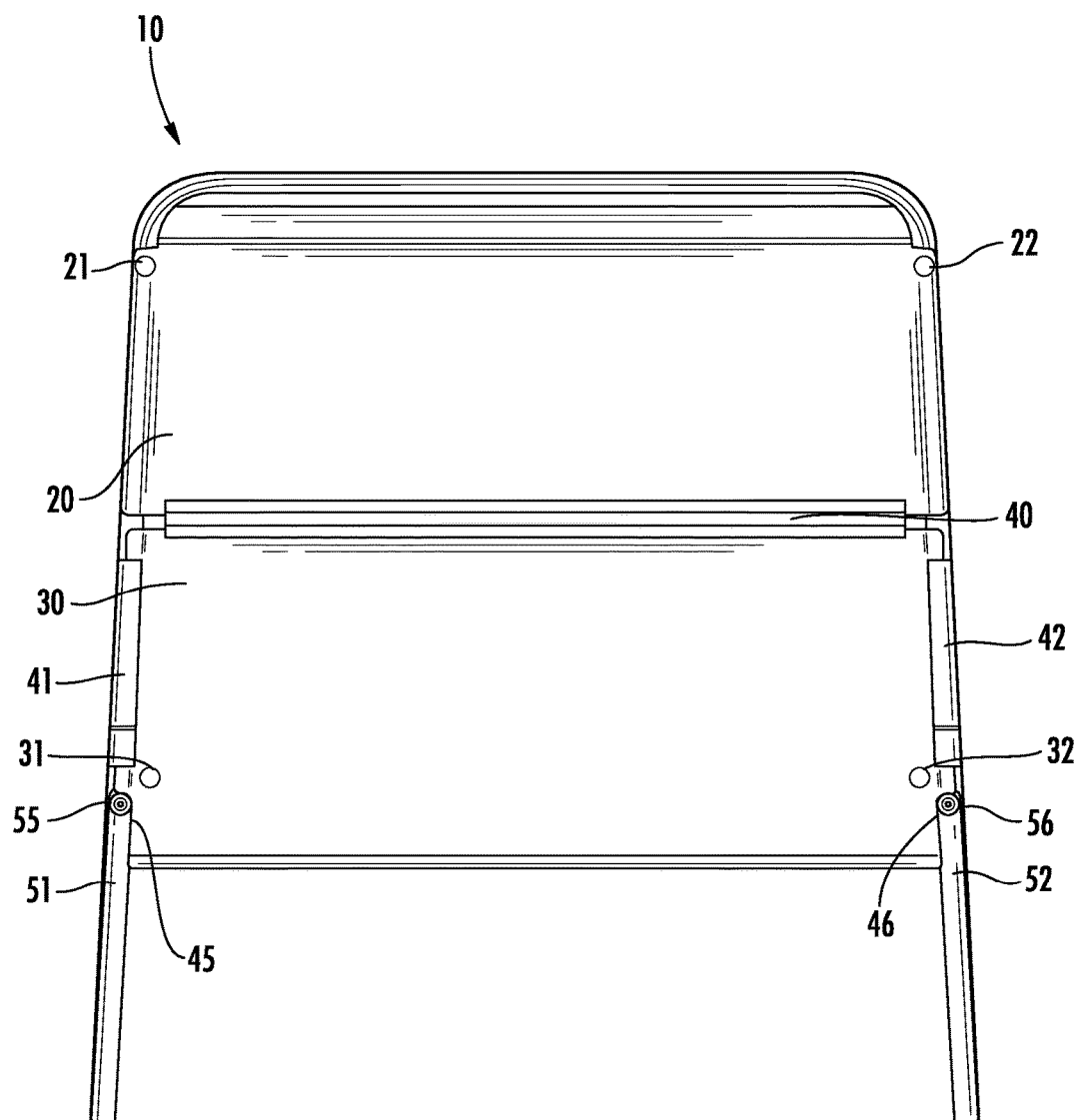
FIG. 2 is a front elevation of the windshield assembly of FIG. 1.

A windshield assembly according to a preferred embodiment of the invention is illustrated in FIGS. 1-4, and shown generally at reference numeral 10. The windshield assembly 10 is adapted for use on a vehicle, such as a golf car. The assembly 10 comprises an upper windshield panel section 20 pivotally connected to a lower windshield panel section 30, as shown in FIGS. 1 and 2. The panels 20, 30 are substantially trapezoidal in shape, and can be made of acrylic or other suitable substantially transparent material.

The panels 20, 30 can be pivotally connected by a hinge member, such as a piano hinge 40. The piano hinge 40 can be made of acrylic, polyvinyl chloride (PVC) or other suitable material. An upper portion of the hinge 40 is attached proximate the bottom edge of the upper panel 20, and a lower portion of the hinge 40 is attached proximate the top edge of the lower panel 30, as shown in FIGS. 1 and 2. The hinge 40 can be attached to the panels 20, 30 using an adhesive or other suitable attachment means.

Figure 9:
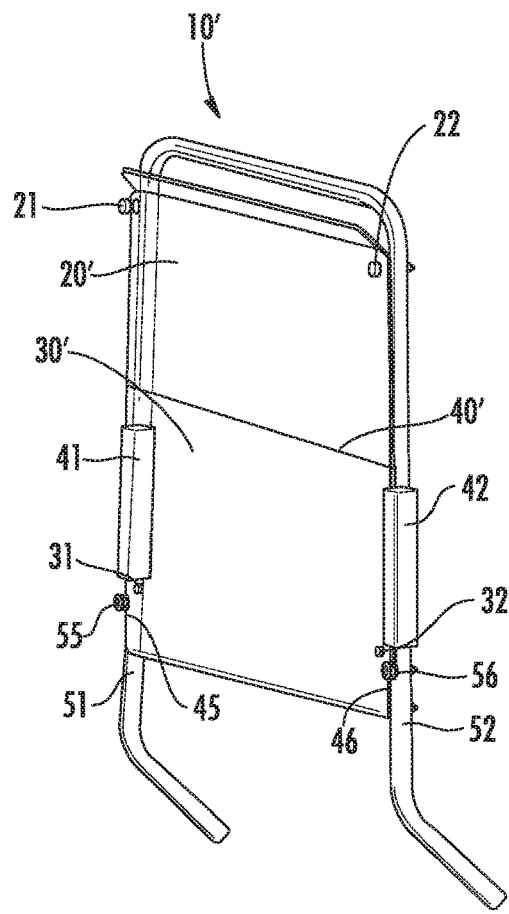
FIGS. 9 and 10 which shows the hinge crease features.
Figure 10:
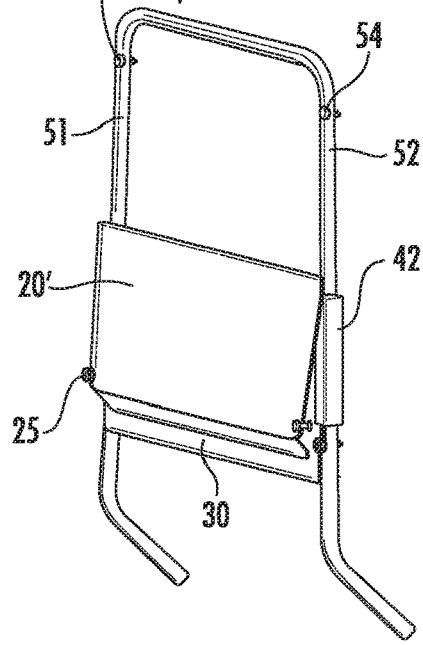

In an alternative embodiment shown in FIGS. 9 and 10 at reference numeral 10', the upper and lower panel sections 20', 30' can be sections of one substantially rectangular windshield panel having a hinge crease 40' integrally formed mid-way in the windshield panel along a horizontal line that defines the upper and lower sections 20', 30'.

Figure 3:
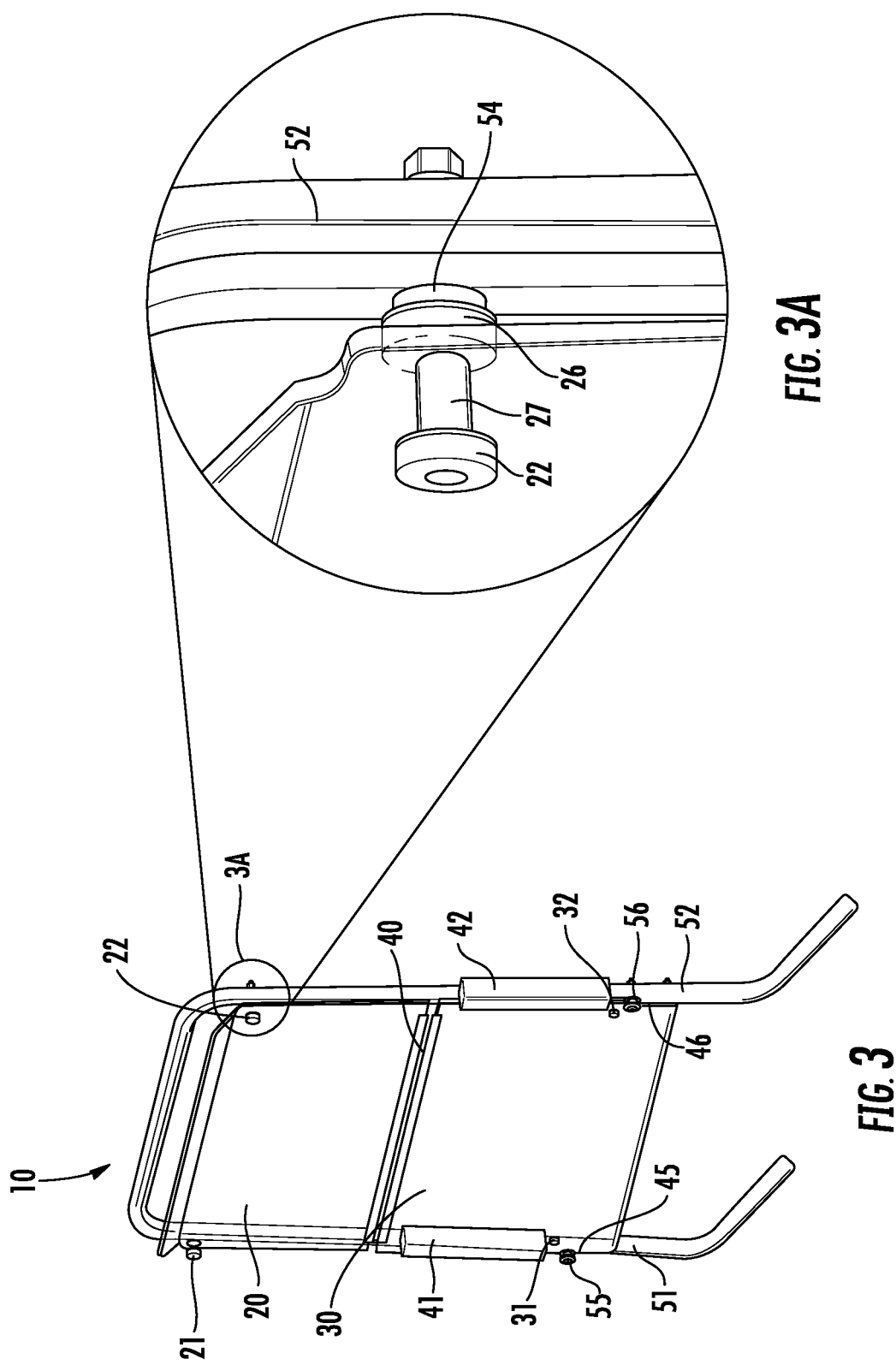
FIG. 3 is another perspective view of the windshield assembly of FIG. 1.
Figure 4:
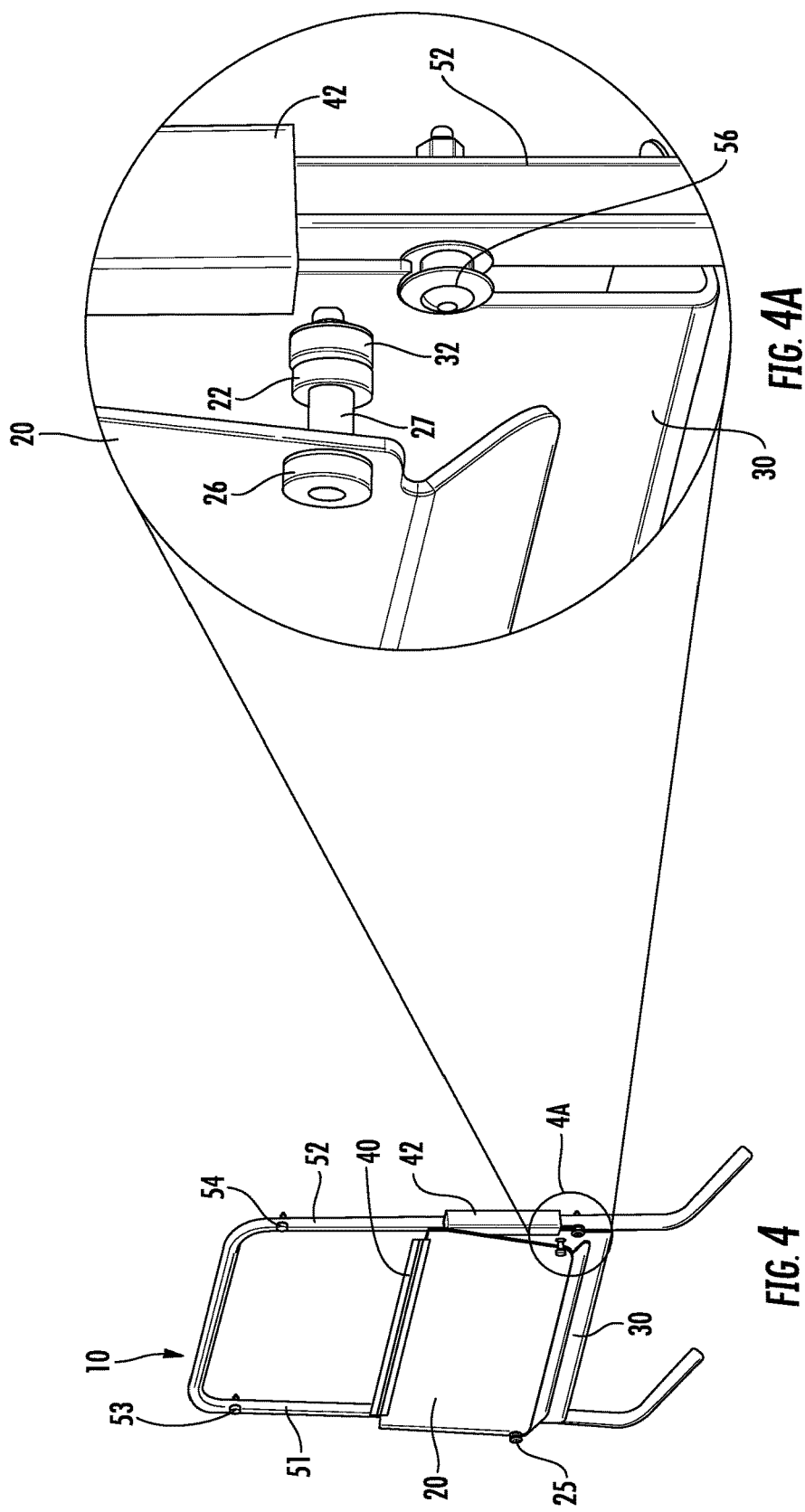
FIG. 4 is another perspective view of the windshield assembly of FIG. 1.

The hinge 40 enables the assembly 10 to be moved from an extended position, shown in FIG. 3, in which the upper panel 20 and lower panel 30 are substantially co-planer, to a pivoted position, shown in FIG. 4, in which the upper panel 20 is folded over and resting on the exterior surface of the lower panel 30. The extended position, shown in FIG. 3, can also be characterized as a closed position, in that the upper and lower panels 20, 30 cooperate as a single windshield that can completely close off the front portion of the golf car on which the assembly 10 is positioned. In the extended position, the windshield assembly 10 can protect occupants of a golf car from the wind and weather elements. The pivoted position, shown in FIG. 4, can be characterized as an open position, in that the area above the lower panel section 30 is open and exposed, allowing wind to freely flow into the interior of the golf car.

A first pair of magnetic members 21, 22 are positioned on the exterior surface of the upper panel 20 proximate the upper left and right corners of the upper panel 20, as shown in FIGS. 1 and 2. A second pair of magnetic members 31, 32 are positioned on the exterior surface of the lower panel 30 proximate the bottom left and right corners of the lower panel 30, as shown in FIGS. 1 and 2.

The magnetic members 21, 22, 31, 32 are comprised of materials such that the upper panel magnetic members 21, 22 and the lower panel magnetic members 31, 32 are magnetically attracted to each other. The upper panel magnetic members 21, 22 can be comprised of a permanently magnetized material such as alnico, and the lower panel magnetic members 31, 32 can be comprised of a material that is not permanently magnetized but is strongly attracted to magnets (ferromagnetic), such as iron, nickel, cobalt or steel. Preferably, the upper panel magnetic members 21, 22 are rubber coated magnets, and the lower panel magnetic members 31, 32 are nickel plated steel discs. Alternatively, the lower panel magnetic members 31, 32 can be comprised of permanently magnetized material, and the upper panel magnetic members 21, 22 can be comprised of a ferromagnetic material.

In another alternative embodiment, both the upper magnetic members 21, 22 and the lower magnetic members 31, 32 can be comprised of permanently magnetized material. In this embodiment, the magnets 21, 22, 31, 32 are positioned such that the upper panel magnets 21, 22 are magnetically attracted to the lower panel magnets 31, 32 when the upper panel 20 is pivoted downward into the pivoted position, as shown in FIG. 4. For example, the upper panel magnets 21, 22 can be positioned on the upper panel 20 such that their north polarity faces outward, and the lower panel magnets 31, 32 can be positioned on the lower panel such that their south polarity faces outward. Alternatively, the upper magnets 21, 22 can be positioned such that their south polarity faces outward, and the lower panel magnets 31, 32 are positioned such that their north polarity faces outward.

Each upper panel magnetic member 21, 22 can be comprised of a rubber coated magnet having a female threaded post. A pair of through holes are formed in the upper right and left corners of the upper panel section 20. Each of the upper panel magnetic members 21, 22 can be attached to the upper panel 20, as illustrated in FIG. 1A with respect to upper magnetic member 22. As shown in FIG. 1A, a plastic standoff 27 is positioned over each through hole 24 on the exterior surface of the upper panel 20 and in communication with the female threaded post of the magnet 22. A pair of secondary magnets 25, 26 are positioned on the interior surface of the upper panel section 20 at the upper left and right corners, as shown in FIG. 1. Each secondary magnet 25, 26 is a rubber coated magnet having a through hole formed in the center of the magnet 25, 26. Each secondary magnet 26 is positioned with its through hole aligned with a through hole 24 of the upper panel section 20, as shown in FIG. 1A. An elongate fastener such as a stainless steel male threaded screw 28 is inserted through the secondary magnet 26 and through the upper panel through hole 24 and the standoff 27 and into the female threaded post of the upper panel magnet 22. The screw 28 can be turned to engage the female threaded post of the upper panel magnet 22. As such, the upper panel magnet 22 is attached to the exterior surface of the upper panel 20, and the secondary magnet 26 is attached to the interior surface of the upper panel. Alternatively, the upper panel magnets 21, 22 and the secondary magnets 25, 26 can be attached to the upper panel 20 by other suitable attachment means, such as an adhesive.

Each lower panel magnetic member 31, 32 can be comprised of a disk having ferromagnetic properties. Preferably, each lower panel magnetic member 31, 32 is a nickel plated steel disk having a female threaded interior. A pair of through holes are formed in the lower right and left corners of the lower panel section 30. Each of the lower panel magnetic members 31, 32 can be attached to the lower panel 30, as illustrated in FIG. 1B with respect to lower magnetic member 32. As shown in FIG. 1B, each lower panel disk 32 is positioned on the exterior surface of the lower panel 30 over a lower panel through hole 34. A stainless steel washer 36 and a stainless steel lock washer 37 can be positioned on the interior surface of the lower panel 30 in opposed position to the disk 32 on the exterior surface of the lower panel, as shown in FIG. 1B. An elongate fastener such as a male threaded stainless steel screw 38 is inserted through the stainless steel lock washer 37, the stainless steel washer 36 and the through hole 34 and into female threaded disk 32, where it can threadingly engage the disk 32. Alternatively, the lower panel magnetic members 31, 32 can be attached to the lower panel 30 by other suitable attachment means, such as an adhesive.

The windshield assembly 10 can be installed on a recreational vehicle such as a golf car. The lower panel 30 of the windshield assembly 10 can be attached to the support posts 51, 52 of a golf car by a pair of extrusion mounting brackets 41, 42, as shown in FIGS. 1-3.

A pair of recesses 45, 46 can be formed in the side edges of the lower panel 30 at the lower corners of the lower panel 30, as shown in FIGS. 1, 1B and 2. The left side recess 45 can be identical to the right side recess 46, shown in detail in FIG. 1B. Each recess 45, 46 create an edge, shown with regard to recess 46 at reference numeral 48 in FIG. 1B, that can rest on grommet and fastener assemblies 55, 56, which are attached to the golf car support posts 51, 52. As such, the grommet and fastener assemblies 55, 56 help support the windshield assembly on the golf car support posts 51, 52.

If the golf car support posts 51, 52 are a non-ferromagnetic material, such as aluminum, ferromagnetic screw assemblies 53, 54 can be attached to support posts 51, 52, as shown in FIGS. 1A and 4. The screw assemblies 53, 54 are attached at positions on the support posts 51, 52, respectively, such that it contacts the secondary magnets 25, 26 when the windshield assembly 10 is in the extended position, as illustrated in FIG. 3A. The magnetic attraction between the secondary magnets 25, 26 and the respective screw assemblies 53, 54 releasably attaches the upper panel 20 to the golf car supports 51, 52 when in the extended position, and helps maintain the upper panel 20 securely in place on the golf car support posts 51, 52 as the golf car moves. In an alternative embodiment, metal plates can be clamped or adhered to the support posts in place of the screw assemblies 53, 54. Alternatively, if the golf car support posts 51, 52 are made of a ferromagnetic material, the secondary magnets can be magnetically attached directly to the support posts 51, 52 with no additional structure.

When a user wishes to be protected adverse weather, wind and sun and the like, the user can choose to keep the windshield assembly in the extended position, shown in FIG. 3, in which the upper and lower panels are substantially co-planar and form a substantially continuous windshield. When the user wants to experience a free flowing breeze through the golf car, the windshield assembly 10 can be moved to the pivoted position, shown in FIG. 4, by pivoting the upper panel 20 about the hinge 40 until the upper panel 20 rests on the lower panel 30. At this point, the area above the lower panel 20 is open to the interior of the golf car, and the upper panel magnetic members 21, 22 contact the lower panel magnetic members 31, 32, respectively, as shown in FIGS. 4 and 4A. The magnetic attractive forces between the upper panel magnets 21, 22 and the lower panel ferromagnetic disks 31, 32 hold the upper panel 20 securely in place on the lower panel 30 as the golf car moves over terrain.

A windshield assembly 100 according to another preferred embodiment of the invention is illustrated in FIGS. 5-8, and shown generally at reference numeral 100. The windshield assembly 100 comprises an upper windshield panel section 120 pivotally connected to a lower windshield panel section 130, as shown in FIGS. 5-8. The panels 120, 130 are preferably rectangular, and can be made of acrylic or other suitable substantially transparent material.

Figure 5:
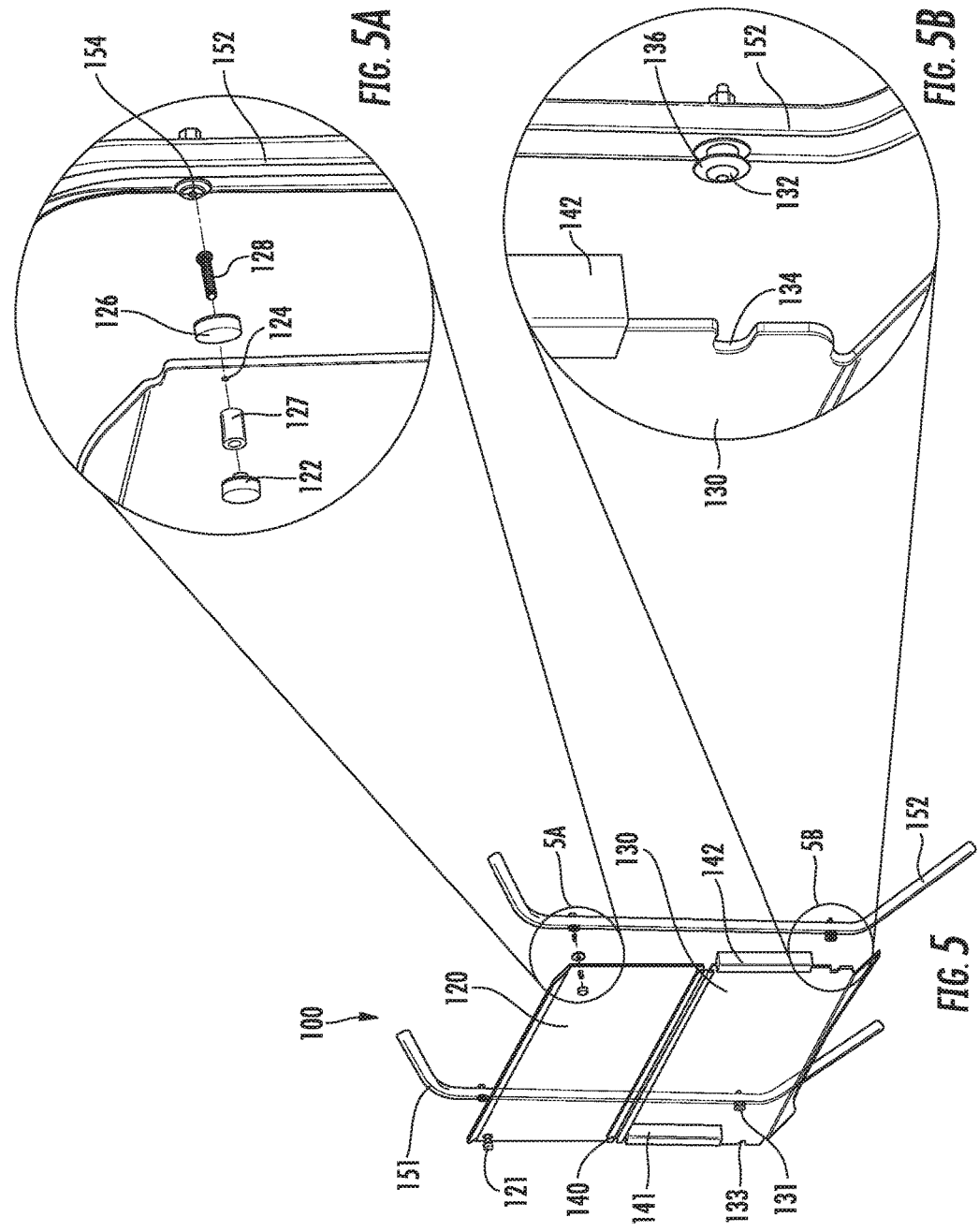
FIG. 5 is a perspective view of a windshield assembly according to another preferred embodiment of the invention.
Figure 6:
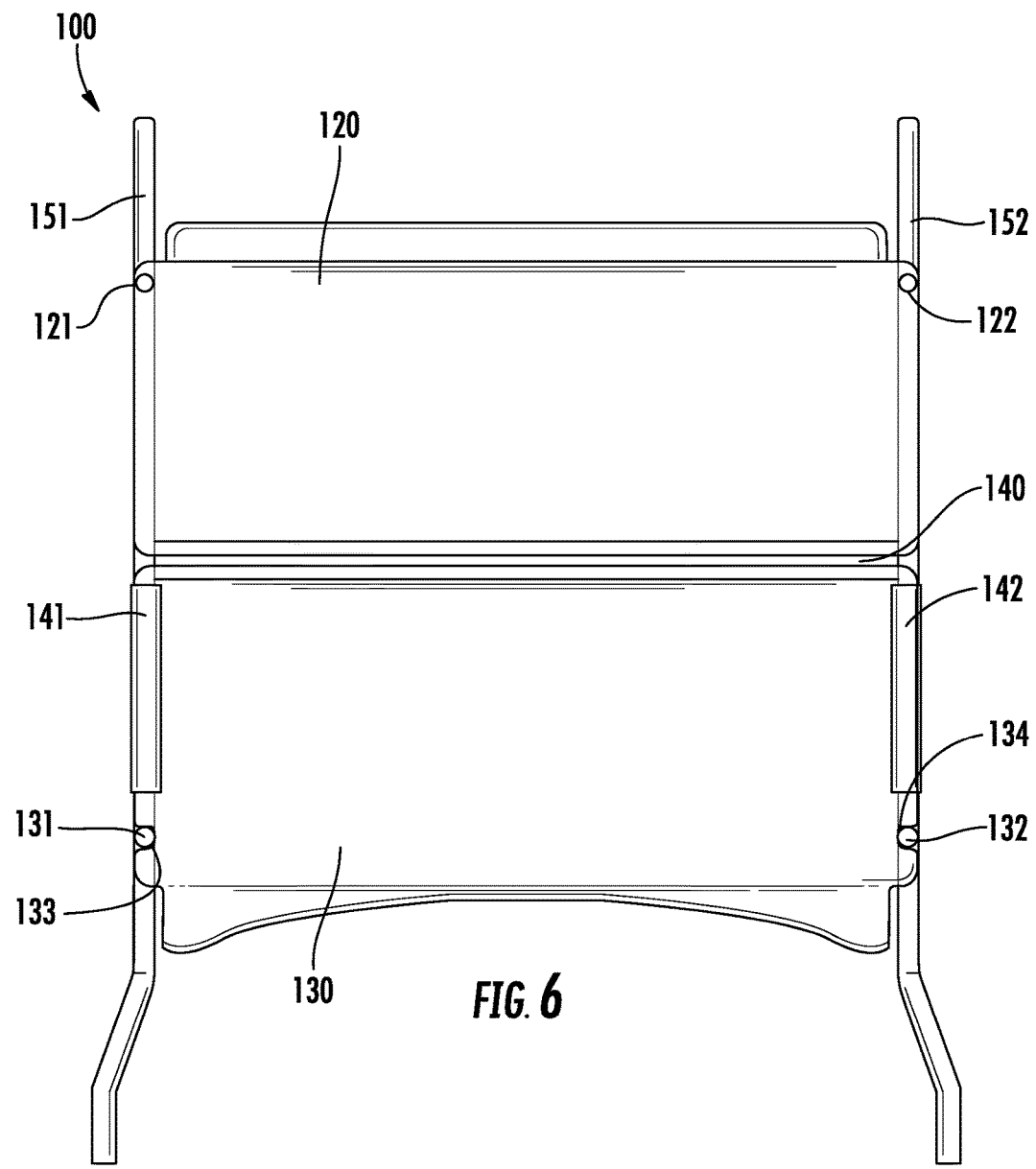
FIG. 6 is a front elevation of the windshield assembly of FIG. 5.

The panels 120, 130 can be pivotally connected by a hinge member, such as a piano hinge 140. The piano hinge 140 can be made of acrylic, polyvinyl chloride (PVC) or other suitable material. An upper portion of the hinge 140 is attached proximate the bottom edge of the upper panel 120, and a lower portion of the hinge 140 is attached proximate the top edge of the lower panel 130, as shown in FIGS. 5 and 6. The hinge 140 can be attached to the panels 120, 140 using an adhesive or other suitable attachment means.

Figure 7:
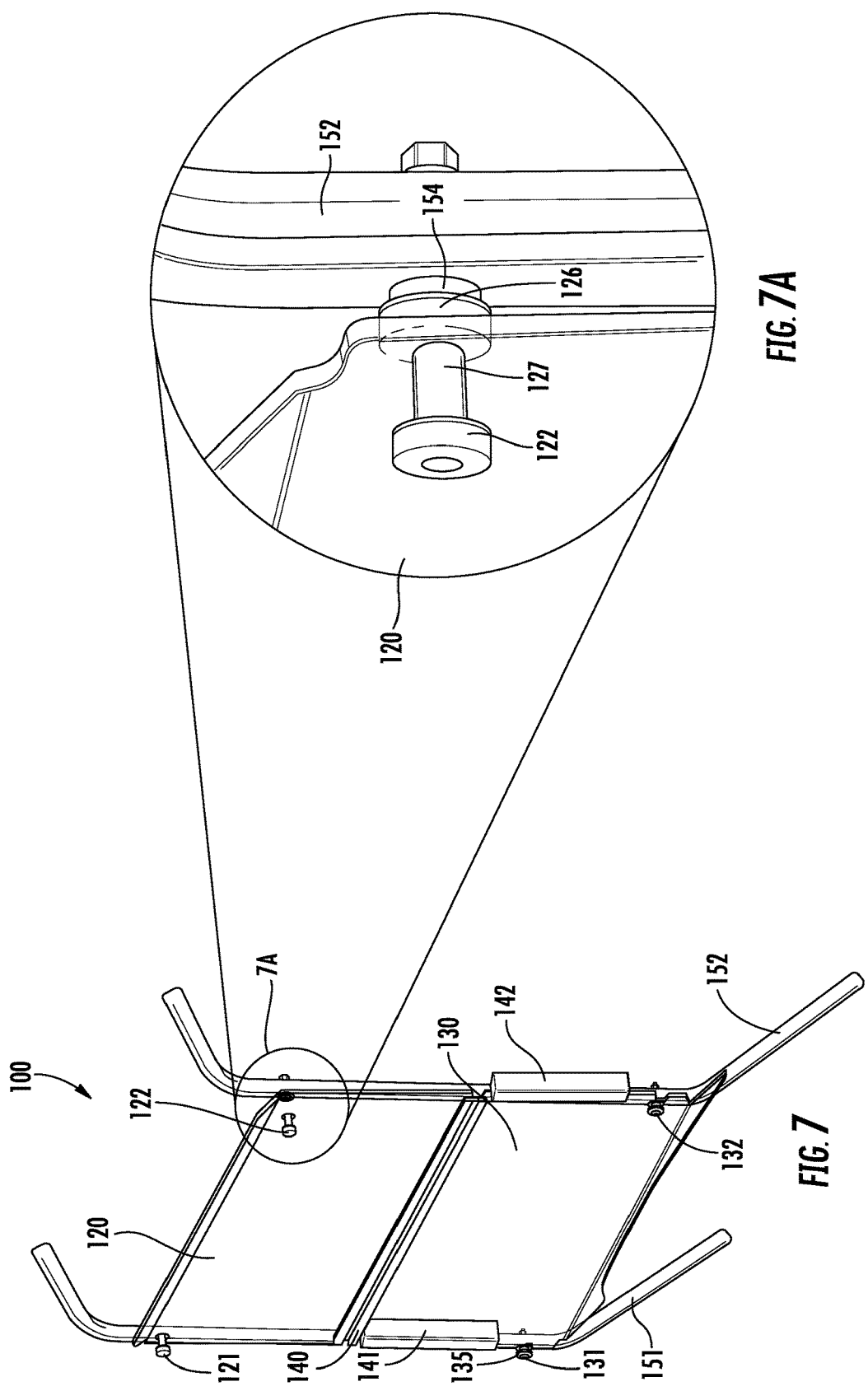
FIG. 7 is another perspective view of the windshield assembly of FIG. 5.
Figure 8:
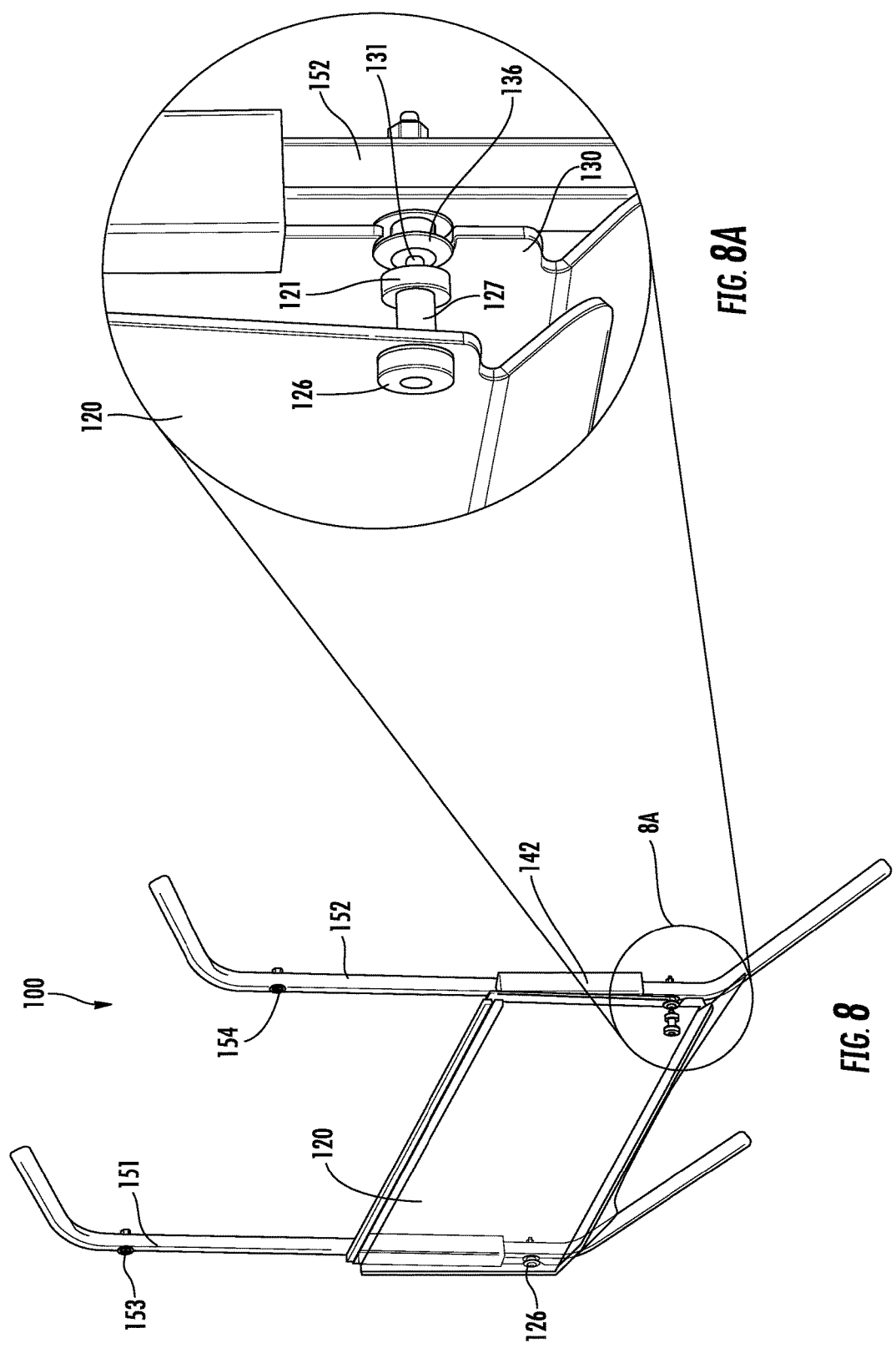
FIG. 8 is another perspective view of the windshield assembly of FIG. 5.

The hinge 140 enables the assembly 100 to be moved from an extended position, shown in FIG. 7, in which the upper panel 120 and lower panel 130 are substantially co-planer, to a pivoted position, shown in FIG. 8, in which the upper panel 120 is folded over and resting on the exterior surface of the lower panel 130. The extended position, shown in FIG. 7, can also be characterized as a closed position, in that the upper and lower panels 120, 130 cooperate as a single windshield that can completely close off the front portion of the golf car on which the assembly 10 is mounted. In the extended position, the windshield assembly 100 can protect occupants of a golf car from the wind and weather elements. The pivoted position, shown in FIG. 8, can be characterized as an open position, in that the area above the lower panel section 130 is open and exposed, allowing wind to freely flow into the interior of the golf car.

A first pair of magnetic members 121, 122 can be positioned on the exterior surface of the upper panel 120 proximate the upper left and right corners of the upper panel 120, as shown in FIGS. 5 and 6. A second pair of magnetic members 131, 132 can be positioned on the support posts 151, 152 of a golf car. The lower panel 130 of the windshield assembly 100 can be attached to the support posts 151, 152 of a golf car by a pair of extrusion mounting brackets 141, 142, as shown in FIGS. 5-7.

The magnetic members 121, 122, 131, 132 are comprised of material such that the upper magnetic members 121, 122 and the lower magnetic members 131, 132 are magnetically attracted to each other. The upper magnetic members 121, 122 can be comprised of a permanently magnetized material such as alnico, and the lower magnetic members 131, 132 can be comprised of a material that is not permanently magnetized but is strongly attracted to magnets (ferromagnetic), such as iron, nickel, cobalt or steel. Alternatively, the lower magnetic members 131, 132 can be comprised of permanently magnetized material, and the upper magnetic members 121, 122 can be comprised of a ferromagnetic material.

In another alternative embodiment, both the upper magnetic members 121, 122 and the lower magnetic members 131, 132 can be comprised of permanently magnetized material. In this embodiment, the magnets 121, 122, 131, 132 are positioned such that the upper magnets 121, 122 are magnetically attracted to the lower panel magnets 131, 132 when the upper panel 120 is pivoted downward into the pivoted position, as shown in FIG. 8. For example, the upper magnets 121, 122 can be positioned on the upper panel 120 such that their north polarity faces outward, and the lower magnets 131, 132 can be positioned on the support posts 51, 52 such that their south polarity faces outward. Alternatively, the upper magnets 121, 122 can be positioned such that their south polarity faces outward, and the lower panel magnets 131, 132 are positioned such that their north polarity faces outward.

Each upper magnetic member 121, 122 can be comprised of a rubber coated magnet having a female threaded post. A pair of through holes are formed in the upper right and left corners of the upper panel section 20. Each of the upper magnetic members 121, 122 can be attached to the upper panel 20, as illustrated in FIG. 1A with respect to upper magnetic member 122. As shown in FIG. 1A, a plastic standoff 127 is positioned over each through hole 124 on the exterior surface of the upper panel 120 and in communication with the female threaded post of the magnet 122. A pair of secondary magnets 125, 126 are positioned on the interior surface of the upper panel section 120 at the upper left and right corners, as shown in FIGS. 5A and 8. Each secondary magnet 125, 126 can be a rubber coated magnet having a through hole formed in the center of the magnet 125, 126. Each secondary magnet 126 is positioned with its through hole aligned with a through hole 124 of the upper panel section 120, as shown in FIG. 5A. An elongate fastener such as a stainless steel male threaded screw 128 is inserted through the secondary magnet 126 and through the upper panel through hole 124 and the standoff 127 and into the female threaded post of the upper panel magnet 122. The screw 128 can be turned to engage the female threaded post of the upper panel magnet 122. As such, the upper panel magnet 122 is attached to the exterior surface of the upper panel 120, and the secondary magnet 126 is attached to the interior surface of the upper panel 120. Alternatively, the upper magnets 121, 122 and the secondary magnets 125, 126 can be attached to the upper panel 120 by other suitable attachment means, such as an adhesive.

In an alternative embodiment, a pair of arcuate recesses can be formed in the left and right side edges of the upper panel 120, and a pair of injection molded magnet docks can be positioned within the recesses, and held in place with an adhesive. Each of the upper magnetic members 121, 122 can include a male segment that is inserted through the magnet docks in the upper panel 120 and is received by the secondary magnets 125, 126 positioned on the opposite side of the upper panel 120.

If the golf car support posts 151, 152 are a non-ferromagnetic material, such as aluminum, screw assemblies 153, 154 made of a ferromagnetic material can be attached to support post 151, 152, as shown in FIGS. 5, 5A and 8. The screw assemblies 153, 154 are attached at positions on the support posts 151, 152, respectively, such that they contact the secondary magnets 125, 126 when the windshield assembly 100 is in the extended position, as illustrated by FIG. 7A. The magnetic attraction between the secondary magnets 125, 126 and the respective screw assemblies 153, 154 releasably attaches the upper panel 120 to the golf car supports 151, 152 when in the extended position, and helps maintain the upper panel 120 securely in place on the golf car support posts 151, 152 as the golf car moves. In an alternative embodiment, metal plates can be clamped or adhered to the support posts in place of the screw assembly 154. Alternatively, if the golf car support posts 151, 152 are made of a ferromagnetic material, the secondary magnets can be magnetically attached directly to the support posts 151, 152 with no additional structure.

Each of the lower magnetic members 131, 132 can be comprised of a flat head screw assembly made of a ferromagnetic material positioned within a grommet 135, 136 attached to a support bar 151, 152, as shown in FIGS. 5B, 7, and 8A. A pair of arcuate recesses 133, 134 are formed in the left and right side edges of the lower panel 130 proximate the lower corners of the lower panel, as shown in FIGS. 5 and 5A. The arcuate recesses 133, 134 are formed at positions on the lower panel 130 such that the lower magnetic members 131, 132 extend through the lower panel 130, as shown in FIGS. 7, 8 and 8A. Original factory fasteners can be removed from the grommets and replaced with the flat head screw assemblies 131, 132.

When a user wishes to be protected from adverse weather, wind and sun and the like, the user can choose to keep the windshield assembly 100 in the extended position, shown in FIGS. 6 and 7, in which the upper and lower panels 120, 130 are substantially co-planar and form a substantially continuous windshield. When the user wishes to experience a free flowing breeze through the golf car, the windshield assembly 100 can be moved to the pivoted position, shown in FIG. 8, by pivoting the upper panel 120 about the hinge 140 until the upper panel 120 rests on the lower panel 130. At this point, the area above the lower panel 20 is open to the interior of the golf car, and the upper magnetic members 121, 122 contact the lower magnetic members 131, 132, respectively, as shown in FIGS. 8 and 8A. The magnetic attractive forces between the upper magnetic members 121, 122 and the lower panel magnetic members 131, 132 hold the upper panel 120 securely in place on the lower panel 130 as the golf car moves over terrain.

A windshield assembly and method of using same are described above. Various changes can be made to the invention without departing from its scope. The above description of various embodiments of the invention are provided for the purpose of illustration only and not limitation—the invention being defined by the claims and equivalents thereof.

What is claimed is:

1. A windshield assembly for a golf car comprising:
(a) an upper panel section pivotally connected to a lower panel section, wherein each of the upper panel section and the lower panel section have a shape selected from substantially rectangular and substantially trapezoidal, each of the upper panel and lower panel sections adapted for positioning on support posts of a golf car and having an interior surface facing the interior of the golf car and an exterior surface facing the exterior of the golf car, the windshield assembly movable between an extended position wherein the upper panel section and the lower panel section are substantially co-planar, and a pivoted position wherein the upper panel section and the lower panel section are substantially co-facing each other;
(b) at least one upper magnetic member comprising a first pair of magnets positioned on the exterior surface of the upper panel section proximate upper corners of the upper panel section, and at least one lower magnetic member positioned at a complementary position on the exterior surface of the lower panel section whereby the at least one upper magnetic member contacts the lower magnetic member when the windshield assembly is in the pivoted position, wherein the at least one upper magnetic member is magnetically attracted to the at least one lower magnetic member, whereby the at least one upper magnetic member and the at least one lower magnetic member are magnetically engaged when the windshield assembly is in the pivoted position; and
(c) a second pair of magnets attached to the interior surface of the upper panel section proximate the upper corners of the upper panel section, and a pair of complementary magnetic members attached to the golf car support posts for magnetically engaging the second pair of magnets when the windshield assembly is in the extended position.

2. The windshield assembly according to claim 1, wherein the upper panel section and the lower panel section are pivotally connected by a hinge.

3. The windshield assembly according to claim 1, wherein the upper panel section and the lower panel section are comprised of a single panel having an integrally formed hinge crease defining the upper panel section and the lower panel section.

4. The windshield assembly according to claim 1, wherein the first pair of magnets comprise rubber coated magnets.

5. The windshield assembly according to claim 4, wherein the at least one lower magnetic member comprises at least one selected from the group consisting of a nickel plated steel disk and a metal screw assembly.

6. The windshield assembly according to claim 1, further comprising first and second mounting brackets positioned on opposing sides of the lower panel section for attaching the lower panel section to the support posts of the golf car.

7. The windshield assembly according to claim 1, wherein the lower section includes a pair of recessed sections formed in opposed side edges of the lower panel section proximate lower corners of the lower panel section, each recessed section defining an edge for resting on a support member attached to the support posts of the golf car.

8. The windshield assembly according to claim 1, wherein the at least one lower magnetic member comprises a pair of members comprised of ferromagnetic material attached to the lower panel section proximate lower corners of the lower panel section.

9. A windshield assembly for a golf car comprising:
(a) an upper panel section pivotally connected to a lower panel section, wherein each of the upper panel section and the lower panel section have a shape selected from substantially rectangular and substantially trapezoidal, each of the upper panel and lower panel sections adapted for positioning on support posts of a golf car and having an interior surface facing the interior of the golf car and an exterior surface facing the exterior of the golf car, the windshield assembly movable between an extended position wherein the upper panel section and the lower panel section are substantially co-planar, and a pivoted position wherein the upper panel section and the lower panel section are substantially co-facing each other;
(b) a pair of upper magnetic members comprising a first pair of magnets positioned on the outer surface of the upper panel section proximate upper corners of the upper panel section, and a pair of lower magnetic members positioned at complementary positions on the golf car support posts whereby the upper magnetic members contact the lower magnetic members when the windshield assembly is in the pivoted position, wherein the upper magnetic members are magnetically attracted to the lower magnetic members whereby the upper magnetic members and the lower magnetic members are magnetically engaged when the windshield assembly is in the pivoted position; and
(c) a second pair of magnets attached to the interior surface of the upper panel section proximate the upper corners of the upper panel section, and a pair of complementary magnetic members attached to the golf car support posts for magnetically engaging the second pair of magnets when the windshield assembly is in the extended position.

10. The windshield assembly according to claim 9, wherein the lower section includes a pair of recessed sections formed proximate lower corners of the lower panel section, wherein the recessed sections allow for the lower magnetic members to extend through the lower panel section and contact the upper magnetic members when the windshield assembly is in the pivoted position.

11. The windshield assembly according to claim 9, wherein the pair of lower magnetic members comprise a ferromagnetic material.

12. A windshield assembly for a golf car comprising:
(a) an upper panel section pivotally connected to a lower panel section, each of the upper panel and lower panel sections adapted for positioning on at least one support post of a golf car and having an interior surface facing the interior of the golf car and an exterior surface facing the exterior of the golf car, the windshield assembly movable between an extended position wherein the upper panel section and the lower panel section are substantially co-planar, and a pivoted position wherein the upper panel section and the lower panel section are substantially co-facing each other;
(b) a first upper magnetic member positioned on the outer surface of the upper panel section, and a lower magnetic member positioned at a complementary position on the at least one golf car support post or on the exterior surface of the lower panel section whereby the first upper magnetic member contacts the lower magnetic member when the windshield assembly is in the pivoted position, wherein the first upper magnetic member is magnetically attracted to the lower magnetic member whereby the first upper magnetic member and the lower magnetic member are magnetically engaged when the windshield assembly is in the pivoted position; and
(c) a second upper magnetic member positioned on the interior surface of the upper panel section, and a complementary magnetic member positioned on the at least one golf car support post for magnetically engaging the second upper magnetic member when the windshield assembly is in the extended position.

13. The windshield assembly according to claim 12, wherein the upper magnetic member comprises a pair of magnets, and the lower magnetic member comprises a pair of members comprised of a ferromagnetic material.

14. The windshield assembly according to claim 12, wherein the second upper magnetic member comprises a pair of magnets, and the complementary magnetic member comprises a pair of members comprised of a ferromagnetic material.

15. The windshield assembly according to claim 12, wherein each of the upper panel section and the lower panel section have a shape selected from substantially rectangular and substantially trapezoidal.

16. The windshield assembly according to claim 12, wherein the upper panel section and the second lower panel section are pivotally connected by a hinge.

17. The windshield assembly according to claim 12, wherein the upper panel section and the lower panel section are comprised of a single panel having an integrally formed hinge crease defining the upper panel section and the lower panel section.

* * * * *